(12) United States Patent
Takeda

(10) Patent No.: US 10,706,526 B2
(45) Date of Patent: Jul. 7, 2020

(54) SUBSTANCE ADHESION SIMULATION APPARATUS

(71) Applicant: FANUC CORPORATION, Yamanashi (JP)

(72) Inventor: Toshiya Takeda, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/249,488

(22) Filed: Jan. 16, 2019

(65) Prior Publication Data

US 2019/0236769 A1 Aug. 1, 2019

(30) Foreign Application Priority Data

Jan. 31, 2018 (JP) .................... 2018-014440

(51) Int. Cl.
*G06T 7/00* (2017.01)
*G01N 19/04* (2006.01)
*G06K 9/00* (2006.01)
*G06T 5/00* (2006.01)

(52) U.S. Cl.
CPC ........... *G06T 7/0004* (2013.01); *G01N 19/04* (2013.01); *G06K 9/00664* (2013.01); *G06T 5/001* (2013.01); *G06T 2207/30168* (2013.01)

(58) Field of Classification Search
CPC .................. G06T 7/0004; G06T 5/001; G06T 2207/30168; G01N 19/04; G06K 9/00664; B25J 19/0066; B25J 19/0095
See application file for complete search history.

(56) References Cited

U.S. PATENT DOCUMENTS

| 8,175,474 B2* | 5/2012 | Kinukawa .......... G03G 15/1605 |
| | | 399/308 |
| 2004/0080294 A1 | 4/2004 | Nihei et al. |
| 2008/0013825 A1 | 1/2008 | Nagatsuka et al. |
| 2014/0074292 A1 | 3/2014 | Sawada |
| 2015/0209118 A1* | 7/2015 | Kopelman .......... A61C 9/0053 |
| | | 433/25 |
| 2015/0296108 A1 | 10/2015 | Hayakawa et al. |
| 2016/0100102 A1 | 4/2016 | Yoshida |

(Continued)

FOREIGN PATENT DOCUMENTS

| CN | 107030520 A | 8/2017 |
| EP | 1426146 A1 | 6/2004 |

(Continued)

OTHER PUBLICATIONS

Search Report by Registered Searching Authority dated Dec. 23, 2019, for Japanese Patent Application No. 2018014440.

(Continued)

*Primary Examiner* — Phuoc Tran
(74) *Attorney, Agent, or Firm* — Karceski IP Law, PLLC

(57) ABSTRACT

This substance adhesion simulation system includes an input unit for inputting a model of a device, and information of a presence state of a substance which may be able to adhere to the device, and a processing unit which estimates an adhesion state of the substance to the device by using the information, which is input to the input unit, and the substance is in a liquid state, a gas state, a mist state, a powder state, a dust state, or a state combining the liquid state and the mist state.

7 Claims, 4 Drawing Sheets

(56) References Cited

U.S. PATENT DOCUMENTS

| | | |
|---|---|---|
| 2016/0184945 A1 | 6/2016 | Saitou |
| 2016/0236352 A1 | 8/2016 | Sawada |
| 2017/0316323 A1 | 11/2017 | Nakanishi et al. |
| 2018/0015617 A1 | 1/2018 | Sawada |

FOREIGN PATENT DOCUMENTS

| | | |
|---|---|---|
| EP | 1881383 A2 | 1/2008 |
| EP | 2878999 A1 | 6/2015 |
| JP | 2004142015 A | 5/2004 |
| JP | 2008021092 A | 1/2008 |
| JP | 2008072416 A | 3/2008 |
| JP | 2008089522 A | 4/2008 |
| JP | 2012065191 A | 3/2012 |
| JP | 2012245570 A | 12/2012 |
| JP | 2014034094 A | 2/2014 |
| JP | 2015109321 A | 6/2015 |
| JP | 2016120580 A | 7/2016 |
| JP | 2017080842 A | 5/2017 |
| JP | 2017094420 A | 6/2017 |
| JP | 2017199256 A | 11/2017 |
| WO | 2014017405 A1 | 1/2014 |

OTHER PUBLICATIONS

Decision to Grant a Patent dated Jan. 21, 2020, for Japanese Patent Application No. 2018014440.
Chinese Office Action dated Apr. 1, 2020, for Chinese Patent Application No. 201910059310.3.
Shiguang Liu, Guojun Chen, et al.,"Realistic Simulation of Stains on Cloth," Journal of Computer Aided Design & Computer Graphics, vol. 20, No. 9, pp. 1110-1116, China Academic Journal Electronic Publishing House (Sep. 2008).

* cited by examiner

SUBSTANCE ADHESION SIMULATION APPARATUS

CROSS-REFERENCE TO RELATED APPLICATIONS

This application is based on and claims priority to Japanese Patent Application No. 2018-014440, filed on Jan. 31, 2018, the entire content of which is incorporated herein by reference.

FIELD OF THE INVENTION

This invention relates to a substance adhesion simulation apparatus.

BACKGROUND OF THE INVENTION

Conventionally, there is a known simulation apparatus which creates a model of an imaging device in a simulation model. (See Japanese Unexamined Patent Application, Publication No. 2008-21092, for example.) Determination of an installation position of an actual imaging device and adjustment of parameters of the actual imaging device require highly specialized skills, highly specialized knowledge, and sufficient experiences. Therefore, this simulation apparatus is used for reducing work of deciding the installation position of the actual imaging device and adjusting the parameters of the actual imaging device.

Also, there is a known robot which automatically determines whether there is adhered dirt on a hand or not on the basis of captured images. (See Japanese Unexamined Patent Application, Publication No. 2012-245570, for example.) This robot determines whether there is adhered dirt on the hand or not by comparing an image of the hand without dirt with a current image of the hand.

Further, a known robot automatically determines whether there is adhered dirt on the hand or not by using a sensor which measures a contact state. (See Japanese Unexamined Patent Application, Publication No. 2008-89522, for example.) This robot has a plurality of gripping portions, which come into contact with an object, and determines a surface state of the object by relatively moving the plurality of the gripping portions.

SUMMARY OF THE INVENTION

A substance adhesion simulation apparatus according to a first aspect of the present invention includes an input device for inputting a model of a device and information of a presence state of a substance which may be able to adhere to the device; and a processing unit which estimates an adhesion state of the substance to the device by using the information which is input to the input unit; wherein, the substance is in a liquid state, a gas state, a mist state, a powder state, a dust state, or a combined state thereof.

DESCRIPTION OF EMBODIMENT(S) OF THE INVENTION

A substance adhesion simulation apparatus 1 according to an embodiment of the present invention will be described below with reference to the accompanying drawings.

Figure 1:
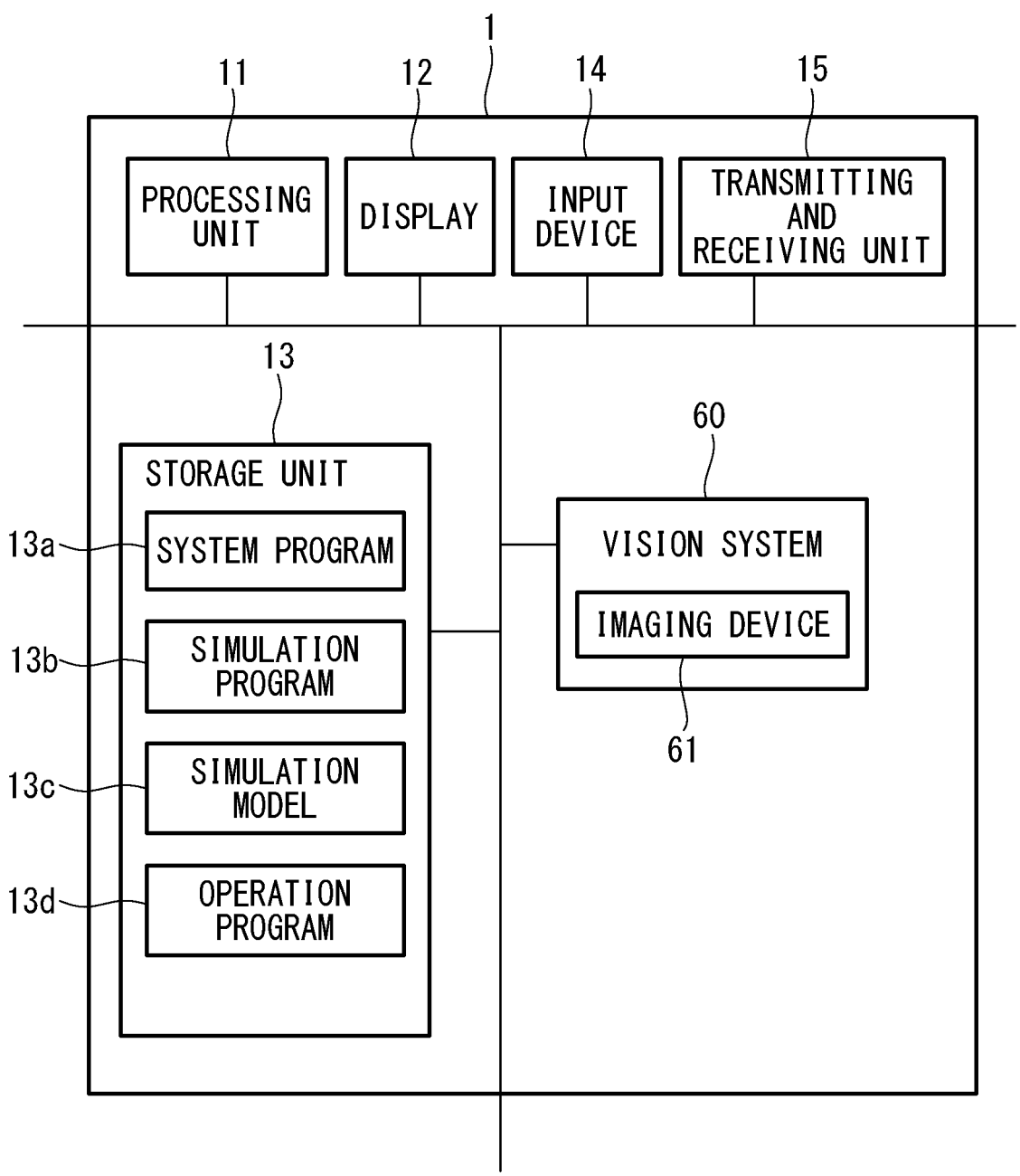
FIG. 1 is a block diagram of a substance adhesion simulation apparatus according to an embodiment of the present invention.

As shown in FIG. 1, the substance adhesion simulation apparatus 1 according to this embodiment includes a processing unit 11 having a processor and the like, a display 12, a storage unit 13 having a non-volatile storage, a ROM, a RAM, and the like, an input device 14, which is a key board, a touch panel, an teach pendant, and the like, and a transmitting and receiving unit 15 for transmitting and receiving signals. The input device 14 and the transmitting and receiving unit 15 function as an input unit.

A system program 13a is stored in the storage unit 13, and the system program 13a provides a basic function of the substance adhesion simulation apparatus 1. Also, at least one simulation program 13b is stored in the storage unit 13. Moreover, at least one simulation model 13c is stored in the storage unit 13.

Figure 3:
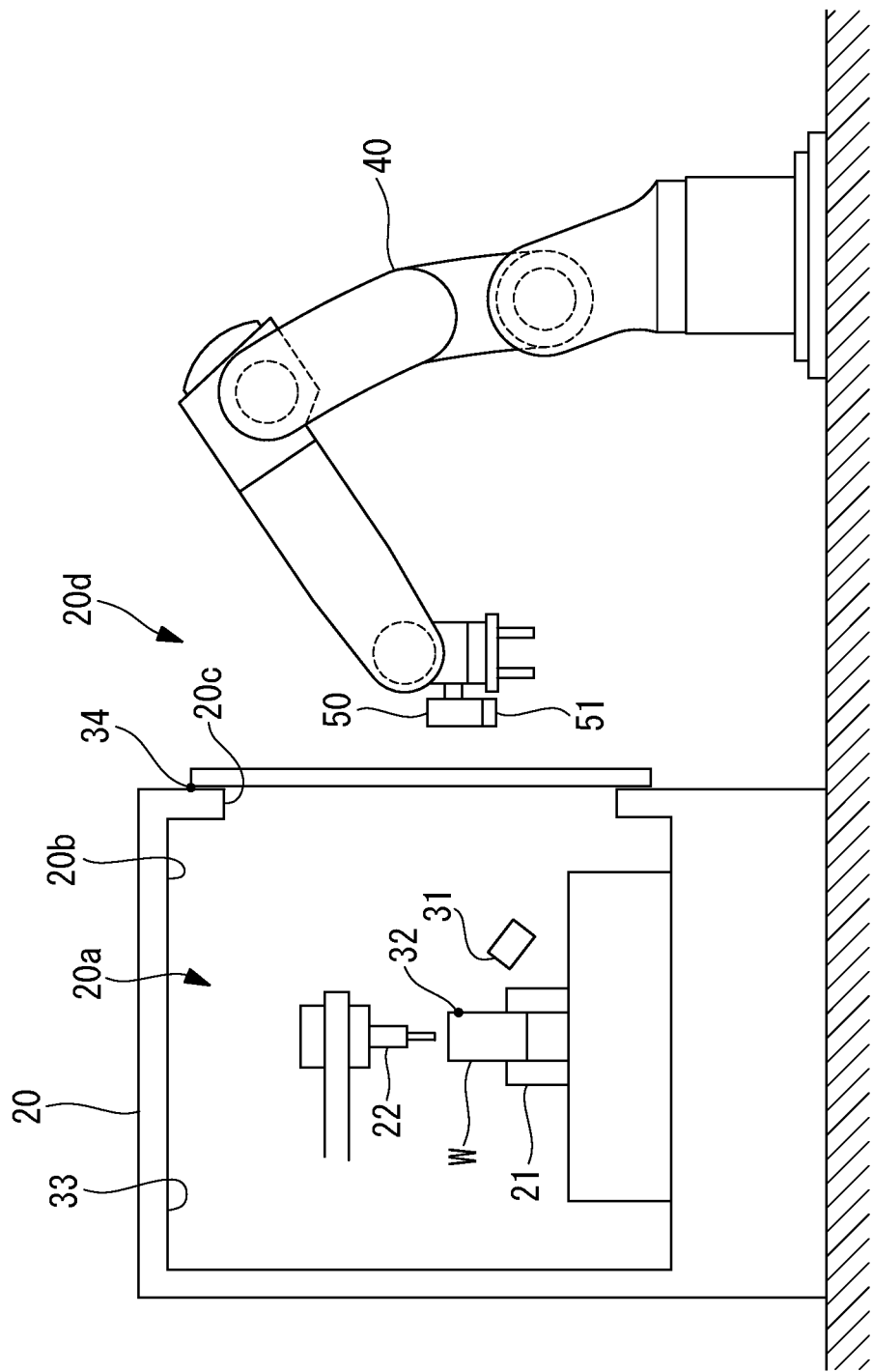
FIG. 3 is a schematic diagram of a simulation model which is used by the substance adhesion simulation apparatus of the embodiment.

As shown in FIG. 3, the simulation model 13c according to this embodiment includes a machine tool 20 which is a machine for manufacturing, a robot 40 which is an articulated robot and the like, and which performs a predetermined operation for the machine tool 20, an imaging device 50 which is a 2D camera, a 3D camera, and the like, an inner space 20a which is a space within the machine tool 20, and an outer space 20d which is a space where the machine tool 20 and the robot 40 exist.

In this embodiment, a hand, a cutting tool, and the like are provided at a distal end of the robot 40. Also, the imaging device 50 is provided at the distal end of the robot 40.

The robot 40 performs predetermined operations to a work W, which is held by the machine tool 20, or the machine tool 20. The predetermined operations in this case refers to a deburring operation, a cutting operation, an assembly operation, an exchange operation of jigs, an exchange operation of works, an installation operation of parts, and the like. A machine in this embodiment refers to the machine tool 20, however, instead of using the machine tool 20, a different type of machine can be set in the simulation model 13c. The robot 40 performs operations in response to the types of the machines, types of work W held by the machine, and the like.

At least one operation program 13d, which makes the robot 40 perform the predetermined operations, is stored in the storage unit 13.

In this embodiment, models of the machine tool 20, the robot 40, the imaging device 50, the inner space 20a, and the outer space 20d of the simulation model 13c respectively correspond to specifications of an actual machine tool, an actual robot, an actual imaging device, an actual inner space, and an actual outer space. Also, the operation program 13d, which is stored in the storage unit 13, corresponds to an operation program which makes the actual robot perform the predetermined operations. With this configuration, it is possible to perform the simulation which is closer to the actual state.

Figure 2:
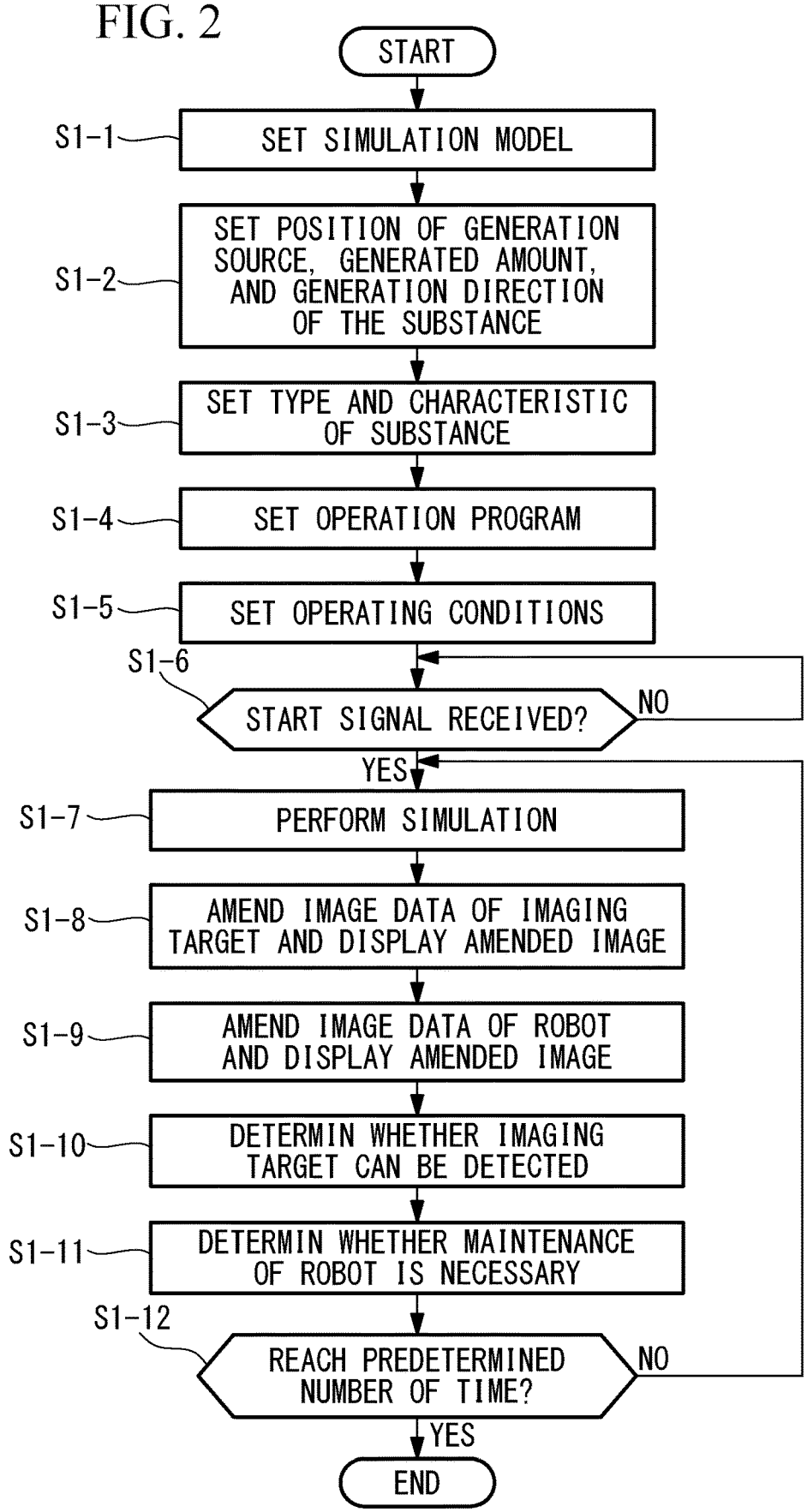
FIG. 2 is a flow chart showing an operation of a processing unit of the substance adhesion simulation apparatus of the embodiment.

The processing unit 11 temporarily stores the simulation program 13b in the RAM. And, the processing unit 11 performs the below described processes on the basis of the simulation program 13b. The processes performed by the processing unit 11 are described below, referring to FIG. 2.

Firstly, the processing unit 11 sets the simulation model 13c on the basis of input which is input to the input device 14 (Step S1-1). In Step S1-1, the processing unit 11 may set the simulation model 13c on the basis of data which is input to the substance adhesion simulation apparatus 1 via the transmitting and receiving unit 15. In this case, data from a computer having a CAD, other simulation apparatus, and the like is input to the substance adhesion simulation apparatus 1.

Next, the processing unit 11 sets at least a position of a generation source of the substance, a generated amount of the substance generated from the generation source, and a generation direction of the substance generated from the generation source on the basis of information which is input by the input device 14 (Step S1-2). In addition, timing of the generation of the substance from the generation source may be set.

Further, the processing unit 11 sets a type of the substance, a characteristic of the substance, and the like on the basis of the information which is input by using the input device 14 (Step S1-3). In Steps S1-2 and S1-3, the processing unit 11 may conduct the above described settings on the basis of the information which is input to the substance adhesion simulation apparatus 1 via the transmitting and receiving unit 15.

The information, which is input by using the input device 14, and the information, which is input via the transmitting and receiving unit 15, are the information of the position of the generation source of the substance, information of the generated amount of the substance generated from the generation source, information of the generation direction of the substance generated from the generation source, information of the type of the substance, and the like. Such information is information which is related to a presence state of the substance in the simulation model 13c.

For example, as shown in FIG. 3, the machine is the machine tool 20, and the substance is cutting oil. A first generation source 31 is a distal end of a nozzle which emits the cutting oil, and the first generation source 31 is placed within the inner space 20a of the machine tool 20. In Step S1-2, the processing unit 11 sets at least a position of the first generation source 31, a generated amount of substance in a liquid state generated from the first generation source 31, and a generation direction of the substance in the liquid state generated from the first generation source 31.

Also, the cutting oil emitted from the first generation source 31 collides with the works W or objects existing around the works W. The object existing around the works W is a chuck 21 of the machine tool 20, a cutting tool 22 for cutting the works W, and the like. In this case, cutting oil in a mist state is generated because of the collision of the cutting oil with the works W or the objects existing around the works W. Therefore, in Step S1-2, the processing unit 11 sets at least a position of a second generation source 32, a generated amount of the substance in the mist state generated from the second generation source 32, and a generation direction of the substance in the mist state generated from the second generation source 32. The second generation source 32 is, for example, a surface of the work W.

Moreover, the cutting oil in the liquid state splashes because of the collision of the cutting oil with the works W or the objects existing around the works W as well. Therefore, in Step S1-2, the processing unit 11 sets at least a generated amount of the substance in the liquid state generated from the second generation source 32, and a generation direction of the substance in the liquid state generated from the second generation source 32. Thus the substance generated from the second generation source 32 is in a mixed state of the liquid state and the mist state.

As an influence of the substance in the liquid state generated from the first generation source 31, an amount, a generated amount, a generation direction, and the like of the substance generated from the work W and the objects existing around the works W may be calculated in the simulation. In this case, the setting of the second generation source 32 is unnecessary.

The substance in the mist state adheres to the ceiling 20b of the inner space 20a, and therefore the substance in the liquid state drops from the ceiling 20b. In other words, the ceiling 20b may possibly be set as a third generation source 33. In this case, in Step S1-2, the processing unit 11 sets at least a position of the third generation source 33, a generated amount of the substance in the liquid state generated from the third generation source 33, and a generation direction of the substance in the liquid state generated from the third generation source 33. As an influence of the substance in the mist state generated from the second generation source 32, an amount, dropping timing, dripping intervals, and the like of the substance in the liquid state drops from the ceiling 20b may be calculated in the simulation. In this case, the setting of the third generation source 33 is unnecessary.

Here, in such a case that the chuck 21, the cutting tool 22, and the like of the machine tool 20 move, the processing unit 11 makes the second generation source 32 move within the simulation model 13c in response to the movement of the chuck 21, the cutting tool 22, and the like. Also, the generated amount and the generation direction of the substance generated from the second generation source 32 change in response to the movement of the second generation source 32.

When the second generation source 32 is set on a surface of a rotational member, such as the cutting tool 22, the processing unit 11 changes the generation direction of the substance generated from the second generation source 32 in response to rotational speed of the rotational member.

At the time of performing the simulation, the substance in the mist state, which is generated from the second generation source 32, escapes from the machine tool 20 via an opening 20c of the machine tool 20. In such a case that the substance in the mist state escapes from the machine tool 20 is important, it may be possible to set a fourth generation source 34. The fourth generation source 34 may be set at the outer space 20d. In this case, the processing unit 11 sets at least a position of the fourth generation source 34, a generated amount of the substance in the mist state generated from the fourth generation source 34, and a generation direction of the substance in the mist state generated from the fourth generation source 43.

In some cases, the substance may include swarf, and the like, which are generated at the time of cutting the works W. For example, swarf which is suspended in the air, swarf which adheres on a wall and the like inside the machine tool 20 due to the static electricity, and the like are generated when cutting plastic works W, works W which are formed by hardening light powder, and the like. In this case, positions and the like of the other generation sources are set.

Subsequently, the processing unit 11 sets the operation program 13d, which is used for operating the robot 40 in the simulation model 13c, on the basis of the information which is input by using the input device 14 (Step S1-4). For example, the operation program 13*d* is an operation program for an actual robot.

Also, the processing unit 11 sets an operating conditions on the basis of the information input by using the input device 14 (Step S1-5). The operating conditions include operating time which operates the robot 40, the machine tool 20, and the like in the simulation model 13*c*. The operating conditions may include a number of times that operates the robot 40, the machine tool 20, and the like in the simulation model 13*c*. The operating conditions may include temperature of the robot 40, temperature of a lens 51 of the imaging device 50, which is attached to the robot 40, and the like. In Steps S1-4 and S1-5, it is possible for the processing unit 11 to conduct the above settings on the basis of the data which is input to the substance adhesion simulation apparatus 1 via the transmitting and receiving unit 15.

Subsequently, when the processing unit 11 receives a start signal for starting the simulation (Step S1-6), the processing unit 11 performs the simulation on the basis of the set operating conditions (Step S1-7). In the simulation, the processing unit 11 estimates an adhesion state of the substance to the lens 51 of the imaging device 50.

Figure 4:
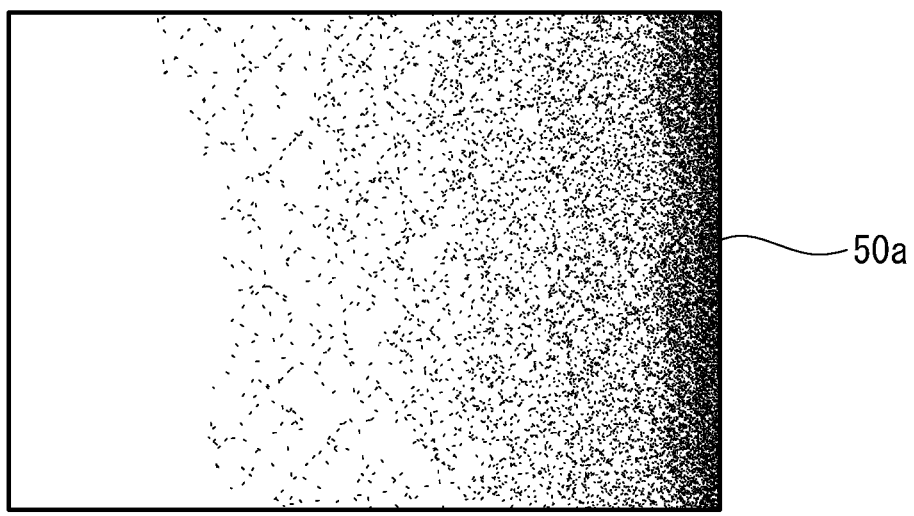
FIG. 4 is a schematic diagram showing data of an adhesion state estimated by the substance adhesion simulation apparatus of the embodiment.

An example of the data of the estimated adhesion state is distribution data of an adhesion amount of the substance which adheres within an angle of view 50*a* of the imaging device 50, which is shown in FIG. 4, for example. The distribution data of the adhesion amount may be data which shows a distribution of visibility degrees within the angle of view. The distribution data of the adhesion amount may be data which is able to specify a range in which an imaging target is clearly visible, a range in which the imaging target looks dim, a range in which the imaging target is indistinct, a range in which the imaging target looks distorted, a range in which the imaging target is discolored, a range in which the imaging target cannot be seen, and the like within the angle of view 50*a*. The various ranges may overlap with each other.

Many of the machine tools 20 open a door when the cutting oil is not emitted from the nozzle. Also, when the door is opened, the substance in the mist state, which exists within the machine tool 20, escapes from the machine tool 20. Such conditions are created in the simulation. In this case, the substance mainly in the mist state adheres to the robot 40 and the lens 51, which are placed outside the machine tool 20. And, when the distal end portion of the robot 40 is placed within the machine tool 20, the substance in the liquid state, which drops from the third generation source 33, adheres to the robot 40 and the lens 51.

When certain exemplary operating conditions are used, and when the lens 51 and the robot 40 are placed outside the machine tool 20, water included in the substance on the surface of the lens 51 and the robot 40 evaporates. In this case, substance in a solid state, substance in a paste state, and the like are accumulated on the surface of the lens 51 and the robot 40. Speed of accumulation of the substance in the solid state and the substance in the paste state varies in response to the operating conditions. For example, degree of evaporation changes in response to the temperature of the lens 51 and the robot 40, standby time of the robot 40, and the like.

Subsequently, the processing unit 11 amends the image data by using the data of the adhesion state estimated in Step S1-7, and displays the amended image data by means of the display 12 (Step S1-8). An example of the image data is of the imaging target captured by using an actual imaging device. Other example of the image data is of computer graphics image data which is an image of the imaging target. In this embodiment, the imaging target is the works W, chuck 21, and the like.

For example, a part of the imaging target is indistinct in the image data, which is amended by using the data of the estimated adhesion state. Also, another part of the imaging target looks dim. And, another part of the imaging target looks distorted. And, another part of the imaging target is discolored. Thus the image data created by the processing unit 11 is an estimated result of a state in which the substance adheres to the lens 51.

On the other hand, the processing unit 11 amends the computer graphics image data, which is an image of the robot 40, by using the data of the adhesion state estimated in Step S1-7, and displays the amended image data by means of the display 12 (Step S1-9).

Next, the processing unit 11 determines whether it is possible to detect the imaging target or not by using the image data amended in Step S1-8 (Step S1-10). In Step S1-10, the processing unit 11 may send the image data, which is amended in Step S1-8, to a vison system 60. In an example, the vision system 60 is included in the substance adhesion simulation apparatus 1. In another example, the vison system 60 is not included in the substance adhesion simulation apparatus 1. The vision system 60 has an actual imaging device 61, and the vision system 60 can determine whether it is possible to detect the imaging target or not by using the image data which is captured by the actual imaging device 61. And, the vision system 60 determines whether it is possible to detect the imaging target or not by using the image data amended in Step S1-8.

In an example, the vision system 60 has a processing unit having a processor and the like, and a storage unit storing an image processing program, a detection program, model image data, and the like. The detection program is a program for detecting a target among the image data by using the model image data.

Next, the processing unit 11 determines whether maintenance of the robot is necessary or not by using the image data amended in Step S1-9 (Step S1-11). The maintenance of the robot is to supply lubricating oil with the robot, wash robot parts, exchange the robot parts, and the like.

Subsequently, the processing unit 11 repeats Steps S1-7 to S1-11 for a predetermined times (Step 1-12). By this, a plurality of the estimated results of the adhesion state, which is variable, can be obtained successively. When the operating time, which is set in Step S1-5, is one hour, an operator and the like can grasp changes with at intervals of one hour.

Note that it is possible to omit Step S1-9 and Step S1-11. Alternatively, it is also possible to omit Step S1-8 and Step S1-10. Further, it is also possible to omit Step S1-11. In this case, the operator and the like determine whether the maintenance of the robot is necessary or not. And, in Step S1-8 and Step S1-9, the display operation by using the display 12 can also be omitted.

Accordingly, in this embodiment, the processing unit 11 estimates the adhesion state of the substance to the imaging device 50 and the robot 40 by using the information of the presence state of the substance. Thus the processing unit 11 estimates the adhesion state of the substance to the imaging device 50 and the robot 40 in use, and the adhesion state of the substance to the imaging device 50 and the robot 40 after use. Such estimated results contribute to an evaluation of system reliability, operation status, and the like of the system which uses the imaging device 50 and the robot 40.

Moreover, in this embodiment, the processing unit 11 outputs the image data of the imaging target, which is amended by using the data of the estimated adhesion state, to the display 12. Therefore, it is possible for the operator and the like to easily recognize the adhesion state. There are some cases in which the operator and the like can recognize the adhesion state by instinct. Thus, this configuration is advantageous for effectively considering the improvement of the system reliability, the operation status, and the like.

In addition, the processing unit 11 may output the data of the estimated adhesion state, which is shown in FIG. 4, to the display 12. In this case, it is also possible for the operator and the like to easily recognize the adhesion state of the substance, and there are some cases in which the operator and the like can recognize the adhesion state by instinct. And, it is also possible to output the amended image data or the data of the estimated adhesion state to displays other than the display 12.

And, the processing unit 11 amends the image data, which is a captured image of the imaging target, or the computer graphics image data of the imaging target, by using the data of the estimated adhesion state. Also, the processing unit 11 can output the amended image data to the vision system 60 which has the actual imaging device 61 for capturing images of the imaging target. The vision system 60 is actually used in order to detect the imaging target. Thus it is possible to test whether the vision system 60 can detect the imaging target or not by using the image data which is amended by the processing unit 11. With the above configuration, it is possible to easily evaluate the future reliability, the operation status, and the like of the vision system 60. And, the above configuration is useful for improving an accuracy of the evaluation results.

Also, in this embodiment, the processing unit 11 amends the image data, which is a captured image of the imaging target, or the computer graphics image data of the imaging target, by using the data of the estimated adhesion state. And, the processing unit 11 determines whether the imaging target can be detected or not by using the amended image data. The processing unit 11 may display this determination result by means of the display 12. This determination result can be used as information, which is used for determining a position, posture, and the like of the imaging device, by the processing unit 11. Thus by making such determination automatically, it becomes possible to perform a process for determining the position, the posture, and the like of the imaging device in a short period of time.

In this embodiment, the processing unit 11 amends the computer graphics image data, which is an image of the robot 40, by using the data of the estimated adhesion state. Moreover, the processing unit 11 outputs the amended image data to the display. Therefore, it is possible for the operator and the like to easily recognize the adhesion state of the substance. There are some cases in which the operator and the like can recognize the adhesion state of the substance by instinct. Accordingly, this configuration is advantageous for effectively considering the improvement of the reliability, the operation status, and the like of the system.

Moreover, in this embodiment, the processing unit 11 amends the computer graphics image data, which is an image of the robot 40, by using the data of the estimate adhesion state. And, the processing unit 11 determines whether the maintenance of the robot 40 is necessary or not by using the amended image data. The processing unit 11 may display this determination result to the display 12. This determination result may be used as information, which is used for determining the position, the posture, an operation, and the like of the robot 40, by the processing unit 11. Thus by making such determination automatically, it becomes possible to perform a process for determining the position, the posture, the operation, and the like of the imaging device in a short period of time.

Further, in this embodiment, as the information of the presence state of the substance, the processing unit 11 receives at least the information of the positions of the generation sources 31, 32, 33, 34, information of the generated amount of the substances generated from the generation sources 31, 32, 33, 34, and information of the generation directions of the substances generated from the generation sources 31, 32, 33, 34. In other words, the simulation is performed in a state which is close to that of the actual system. Therefore, it is possible for the operator and the like to effectively consider the improvement of the reliability, the operation status, and the like of the system.

Also, in Step S1-5, the processing unit 11 may set cleaning conditions of the lens 51 and the robot 40 on the basis of the information which is input by using the input device 14 and the like. The cleaning conditions refer to conditions for cleaning the lens 51 and the robot 40 at predetermined time intervals and by means of a predetermined cleaning method. The predetermined cleaning method includes a method to wash the lens 51 and the robot 40 with water, a method to clean the lens 51 and robot 40 by blowing air, and the like. In this case, it is possible to find suitable cleaning conditions for preventing the lens 51 and the robot 40 from getting dirty, by trying different cleaning methods, different timings of cleaning, and the like.

In this embodiment, preferably, before the simulation in Step S1-7 is performed, the processing unit 11 operates the machine tool 20 and the robot 40 in the simulation model 13c. At this time, when the imaging device 51 is placed at the position and in the posture for capturing the images of the imaging target, the processing unit 11 may form images of the imaging target, which is seen from the position of the imaging device 50, on the basis of the simulation. These images are influenced by the substances generated from the first generation source 31, the second generation source 32, the third generation source 33, and the fourth generation source 34. For example, in these images, the substance in the mist state which is suspending in the air, the substance in the liquid state which is dropping, and the like exist.

Also, in Step S1-8, when the processing unit 11 displays the amended image data by means of the display 12, the processing unit 11 may amend the images of the imaging target, which is seen from the position of the imaging device 50, by using the data of the estimated adhesion state. By this process, images, which is in a state where the imaging device is actually used, can be obtained, and therefore, this is advantageous for effectively considering the improvement of the reliability, the operation status, and the like of the system.

In this embodiment, in Step S1-10, the processing unit 11 sends the amended image data to the vision system 60. On the other hand, in Step S1-10, the processing unit 11 may send the data of the adhesion state, which is estimated in Step S1-7, to the vision system 60. In this case also, it becomes possible to make the determination, which is described in Step S1-10, as long as the vision system 60 amends the images of the imaging target by using the data of the estimated adhesion state.

Note that it is possible to divide the inner space 20a to a plurality of areas, and also to divide the outer space 20b to a plurality of areas. In this case, as the information of the presence state of the substance, an amount or concentration of the substance in the mist state, which exists in each area, may be input by using the input device 14, for example. In this case also, the same functions and effects as described above can be obtained.

Moreover, the substance adhesion simulation apparatus 1 may be provided in a robot controller or a controller of the machine, such as the machine tool. And, the substance adhesion simulation apparatus 1 may be provided in a host system, which controls a plurality of the robots or a plurality of the machines.

With the simulation model 13c of this embodiment, the imaging device 50 is provided at the distal end portion of the robot 40. On the other hand, the imaging device 50 may be provided at the inside or the outside of the machine tool 20. In this case also, it is possible to perform the same simulation as described above.

Also, in this embodiment, the machine tool 20 is set as the machine in the simulation model 13c, however, a model of the other machine may be set in the simulation model 13c instead of the machine tool 20. The other machine refers to a vulcanization molding machine, a press machine, a painting booth, a washing booth, an injection molding machine, and the like. When the machine is the vulcanization molding machine, the robot performs the exchange operation of the works, the deburring operation, the inspection operation, and the like to the vulcanization molding machine. When the machine is the washing booth, the robot is placed in the washing booth, and the robot moves a washing nozzle. To the other machines, the robot performs operations which correspond to the respective types of the machines.

When the machine is the vulcanization molding machine, a position of a generation source of sulfur gas, a generated amount of the sulfur gas generated from the generation source, a generation direction of the sulfur gas generated from the generation source, and the like are set in the simulation model 13c. When the machine is the washing booth, a position of a generation source of a cleaning solution, a generated amount of the cleaning solution generated from the generation source, a generation direction of the cleaning solution generated from the generation source, and the like are set in the simulation model 13c. Thus, in these cases, the substance is the sulfur gas or the cleaning solution. The substance is preferably in the liquid state, the gas state, the mist state, a powder state, a dust state, or a combined state thereof.

In this embodiment, the machine tool 20 which is the machine, the robot 40, and the imaging device 50 are set in the simulation model 13c, however, this model is nothing but an example. In other words, it is unnecessary to set the machine tool 20, the robot 40, or the imaging device 50 in the simulation model 13c.

Also, in such a case where only the robot 40 is set in the simulation model 13c, with respect to the robot 40, the same effect as described above can be obtained as long as the presence state of the substance is set. And, in such a case where only the imaging device 50 is set in the simulation model 13c, with respect to the imaging device 50, the same effect as described above can be obtained as long as the presence state of the substance is set. Other device may be set in the simulation model 13c.

Moreover, in this embodiment, a model which shows entire bodies of the robot 40 and the imaging device 50 is set in the simulation model 13c. Thus the model of the device is the model showing the entire body of the robot 40, and the model showing the entire body of the imaging device 50. On the other hand, the model of the device may be a model showing only an outer surface of the lens 51 of the imaging device 50, and a model showing one of the parts of the robot 40. The same simulation can be performed even when a model, which only shows the part of the imaging device 50 or the robot 40, is used as the model of the device.

The following aspects of the present invention are derived from the above disclosure.

A substance adhesion simulation apparatus according to a first aspect of the present invention includes an input device for inputting a model of a device and information of a presence state of a substance which may be able to adhere to the device; and a processing unit which estimates an adhesion state of the substance to the device by using the information which is input to the input unit; wherein, the substance is in a liquid state, a gas state, a mist state, a powder state, a dust state, or a combined state thereof.

In the above aspect, the processing unit estimates the adhesion state of the substance to the device by using the information of the presence state of the substance which may be able to adhere to the device. Thus the adhesion state of the substance to the device in use, the adhesion state of the substance to the device after use, and the like are estimated by the processing unit. Such estimated results contribute to an evaluation of reliability, operation status, and the like of a system using the device.

In the above aspect, preferably, the device is an imaging device, which obtains image data, and the processing unit outputs the data of the estimated adhesion state or image data which is amended by using the data of the estimated adhesion state to a display.

When this aspect is used, an operator and the like can easily recognize the adhesion state. There are some cases in which the operator and the like can recognize the adhesion state by instinct. Therefore, this aspect is advantageous for effectively considering improvement of the system reliability, the operation status, and the like.

With the above aspect, preferably, the device is the imaging device which obtains the image data, and the processing unit performs an amendment process which which amends image data which is an image of a predetermined imaging target, or computer graphical image data of a predetermined imaging target, by using data of the estimated adhesion state; and an output process which output the image data which is amended by the amendment process to a vision system having an imaging device for capturing an image of the predetermined imaging target.

The vision system is actually used for detecting the imaging target. Thus it is possible to test whether it is possible that the vision system detects the imaging target or not by using the image data, which is amended by the processing unit. With this aspect, it is possible to easily evaluate the future reliability, the operation status, and the like of the vision system. Also, this aspect is useful for improving an accuracy of the evaluation results.

With this embodiment, preferably, the device is the imaging device which obtains the image data, and the processing unit performs: an amendment process which amends image data which is an image of the predetermined imaging target or computer graphical image data of the predetermined imaging target, by using data of the estimated adhesion state; and a determination process which determines whether it is possible to detect the predetermined imaging target or not by using the image data amended by the amendment process.

The processing unit may display this determination result by using the display. This determination result may be used as information, which is used for determining a position or posture of the imaging device, by the processing unit. Thus by automatically making such determination, it is possible to perform a process, which determines the position and the posture of the imaging device, in a short period of time.

With the above aspect, preferably, the device is a robot, the processing unit performs an amendment process which amends computer graphics image data of the robot by using data of the estimated adhesion state, and an output process which outputs the image data amended by the amendment process to the display.

When this aspect is used, the operator and the like can easily recognize the adhesion state. There are some cases in which the operator and the like can recognize the adhesion state by instinct. Therefore, this aspect is advantageous for effectively considering the improvement of the system reliability, the operation status, and the like.

In the above aspect, preferably, the device is the robot, and the processing unit performs an amendment process which amends a computer graphics image data of the robot by using data of the estimated adhesion state, and a determination process which determines whether a maintenance of the robot is necessary or not by using the image data amended by the amendment process.

The processing unit may display the determination result by using the display. This determination result may be used as information, which is used for determining a position, posture, an operation, and the like of the robot, by the processing unit. In other words, by automatically making such determination, it is possible to perform a process, which determines the position, the posture, the operation, and the like of the robot, in a short period of time With the above described aspect, preferably, information of the presence state of the substance includes at least information of a position of a generation source of the substance, information of an generated amount of the substance generated from the generation source, and information of a generation direction of the substance generated from the generation source.

When this aspect is used, the simulation which is closer to the actual state is performed. Thus, the operator and the like can effectively consider the improvement of the system reliability, the operation status, and the like.

According to the above aspects, it is possible to estimate dirt adheres to a device in response to elapsed time in order to contribute to an evaluation of system reliability, an operation status, and the like.

The invention claimed is:

1. A substance adhesion simulation apparatus comprising:
an input device for inputting a model of a device and information of a presence state of a substance which may be able to adhere to the device; and
a processing unit which estimates an adhesion state of the substance to the device by using the information which is input to the input unit; wherein,
the substance is in a liquid state, a gas state, a mist state, a powder state, a dust state, or a combined state thereof.

2. The substance adhesion simulation apparatus according to claim 1, wherein the device is an imaging device which obtains image data; and
the processing unit outputs data of the estimated adhesion state or image data which is amended by using the data of the estimated adhesion state to a display.

3. The substance adhesion simulation apparatus according to claim 1, wherein the processing unit performs:
an amendment process which amends image data which is an image of a predetermined imaging target, or computer graphical image data of a predetermined imaging target, by using data of the estimated adhesion state; and
an output process which output the image data which is amended by the amendment process to a vision system having an imaging device for capturing an image of the predetermined imaging target.

4. The substance adhesion simulation apparatus according to claim 1, wherein the processing unit performs:
an amendment process which amends image data which is an image of the predetermined imaging target or computer graphical image data of the predetermined imaging target, by using data of the estimated adhesion state; and
a determination process which determines whether it is possible to detect the predetermined imaging target or not by using the image data amended by the amendment process.

5. The substance adhesion simulation apparatus according to claim 1, wherein the device is a robot, and
the processing unit performs an amendment process which amends computer graphics image data of the robot by using data of the estimated adhesion state, and
an output process which outputs the image data amended by the amendment process to the display.

6. The substance adhesion simulation apparatus according to claim 1, wherein the device is a robot, and
the processing unit performs an amendment process which amends a computer graphics image data of the robot by using data of the estimated adhesion state, and
a determination process which determines whether a maintenance of the robot is necessary or not by using the image data amended by the amendment process.

7. The substance adhesion simulation apparatus according to claim 6, wherein information of the presence state of the substance includes at least information of a position of a generation source of the substance, information of an generated amount of the substance generated from the generation source, and information of a generation direction of the substance generated from the generation source.

* * * * *